United States Patent [19]
Sato et al.

[11] Patent Number: 5,014,799
[45] Date of Patent: May 14, 1991

[54] MEASURING APPARATUS

[75] Inventors: Akira Sato, Saitama; Kazuaki Hama, Tokyo; Makoto Nakao, Tokyo; Junichi Misawa, Tokyo; Hiroyuki Suzuki, Kanagawa, all of Japan

[73] Assignees: Bridgestone Corporation; Misawa Shokai Co., Ltd., both of Tokyo, Japan

[21] Appl. No.: 449,674

[22] Filed: Dec. 12, 1989

[30] Foreign Application Priority Data

Dec. 19, 1988 [JP] Japan .................. 63-319972

[51] Int. Cl.⁵ .................. G01G 3/14; G01L 1/22
[52] U.S. Cl. .................. 177/211; 73/862.65
[58] Field of Search .................. 177/211, 255; 73/862.04, 862.65, 147

[56] References Cited

U.S. PATENT DOCUMENTS 3,985,025 10/1976 Ormond .................. 177/255 X
4,448,083 5/1984 Hayashi .................. 73/862.04

Primary Examiner—George H. Miller, Jr.
Attorney, Agent, or Firm—Jordan and Hamburg

[57] ABSTRACT

The present invention provides a measuring apparatus comprising a load receiving plate, a frame member enclosing the load receiving plate, and at least four beams coupling the load receiving plate and the frame member to each other, thereby supporting the load receiving plate. The beams are so formed as to deflect at predetermined portions thereof in response to X-, Y- and Z-axial components of a force applied to the load receiving plate under the assumption that a direction perpendicular to the load receiving plate is taken as the Z-axial direction and directions perpendicular to each other in the horizontal plane of the load receiving plate are taken as the X- and Y-axial directions, respectively, and strain gauges are provided at predetermined portions of the beams.

5 Claims, 2 Drawing Sheets

MEASURING APPARATUS

BACKGROUND OF THE INVENTION

1. Field of the Invention

The present invention relates to a measuring apparatus capable of measuring not only the weight of a vehicle or the like (in the Z-axial direction) but also, a force which moves an automobile under test within a wind tunnel, nemely, a horizontal load (in the X-axial direction), as well as at least a third component of a load, namely in a direction perpendicular to the X-axial direction (Y-axial direction).

2. Description of the Prior Art

A measuring apparatus using strain gauges instead of load cells is disclosed in U.S. Pat. No. 4,726,436. However, this conventional measuring apparatus cannot measure simultaneously forces in two different directions perpendicular to each other in a horizontal plane, that is, in the X- and Y-directions.

Recently, it has become increasingly necessary to measure the vector of a force (direction of input and magnitude ... components X, Y and Z), not a force in a single direction, for measurement and control of forces in precision machine tools such as NC milling cutters, robots and so forth.

SUMMARY OF THE INVENTION

Accordingly, the present invention has an object to provide a measuring apparatus capable of measuring loads in at least X-, Y- and Z-directions to meet the above-mentioned needs.

The above object is accomplished by providing a measuring apparatus comprising a load receiving plate to which a load is to be applied, a frame member enclosing the load receiving plate, at least four beams coupling the load receiving plate and the frame member to each other, thereby supporting the load receiving plate, the beams being so formed as to deflect at predetermined portions thereof in response to X-, Y- and Z-axial components of a force applied to the load receiving plate under the assumption that a direction perpendicular to the load receiving plate is taken as the Z-axial direction and directions perpendicular to each other in the horizontal plane of the load receiving plate are taken as the X- and Y-axial directions, respectively, and strain gauges provided at predetermined portions of the beams.

According to the present invention, the load receiving plate to which a load to be measured is applied is supported by at least four beams. When a load is applied to the load receiving plate, the predetermined portions of the beams deflect in response to the X-, Y- and Z-axial components of the load or force thus applied, and these deflections are detected as strain by the strain gauges. Thus, the components of the force or loads in the respective three directions are measured by measuring apparatus not of a complicated structure but of a simple one according to the present invention. Such simple structure can be realized by working out the shape and structure of the beams. Further, since the load receiving plate and frame member are coupled to each other by means of beams, namely, since an integral plate-like structure is attained, the measuring apparatus according to the present invention is so sturdy that it is not easily broken and also can be designed compact and lightweight as a whole.

These and other objects and advantages of the present invention will be better understood from the ensuing description made, by way of example, of the preferred embodiment of the present invention with reference to the drawings.

DETAILED DESCRIPTION OF THE PREFERRED EMBODIMENT

Figure 1:
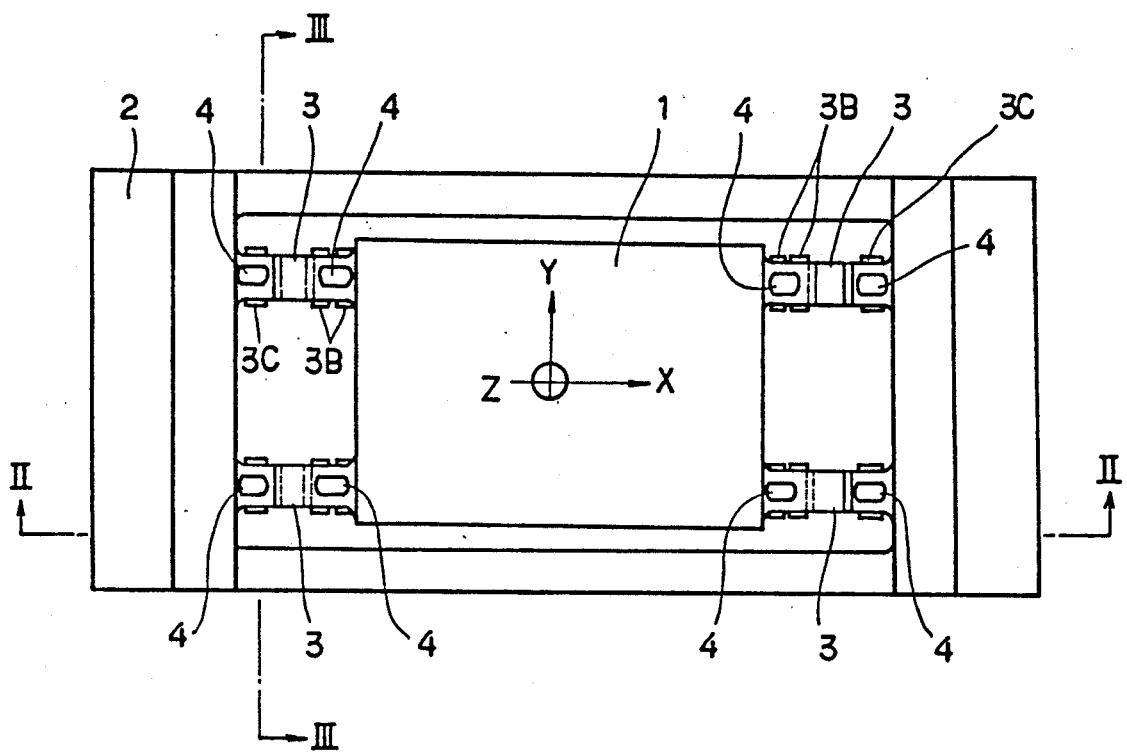
FIG. 1 is a schematic plan view showing the preferred embodiment of the present invention.
Figure 2:
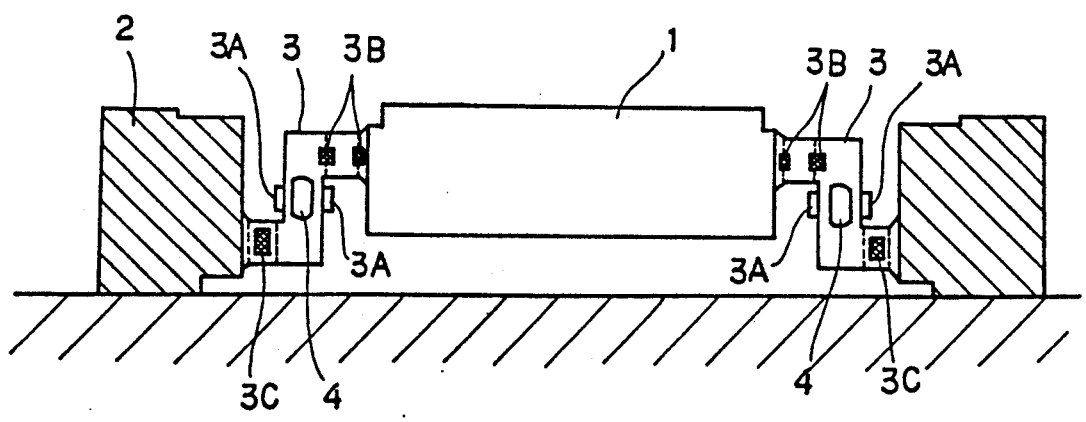
FIG. 2 is a sectional view taken along the line II—II in FIG. 1.
Figure 3:
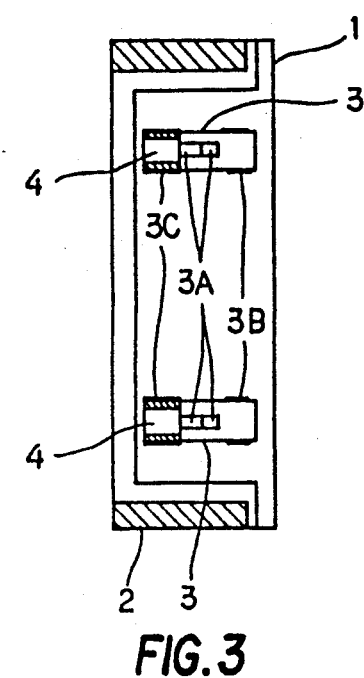
FIG. 3 is a sectional view taken along the line III—III in FIG. 1.

FIG. 1 is a schematic plan view of the measuring apparatus according to the present invention. As seen, a load receiving plate 1 to which a load is applied and a frame member 2 enclosing the load receiving plate 1 are coupled to each other by means of at least four beams 3, and thus the load receiving plate 1 is supported by the frame member 2. The beams employed in the measuring apparatus according to the present invention are shaped each like a crank in the vertical direction as shown in FIG. 2. When the measuring apparatus is set, the bottom of the frame member 2 rests on the floor surface while the load receiving plate 1 is off the surface. The crank-shaped beams 3 have formed therein through-holes 4 at two places from the top to the bottom thereof and a through-hole 4 at one place in the lateral side thereof. Each of the beams 3 has strain gauges 3A provided on opposite sides of the vertical portion thereof, strain gauges 3B provided on the horizontal portion thereof near the load receiving plate 1 and which are phase shifted by 90 deg. from the strain gauges 3A, and strain gauges 3C provided on the horizontal portion thereof near the frame member 2. The through-holes 4 are provided to improve the sensitivity of the strain gauges 3A to 3C. Because of these through-holes 4, the beams 3 are more sensitive to a load applied to the load receiving plate 1. FIG. 3 shows the section taken along the line III—III in FIG. 1, from which the through-holes 4 and strain gauges 3A are clearly seen.

Figure 4:
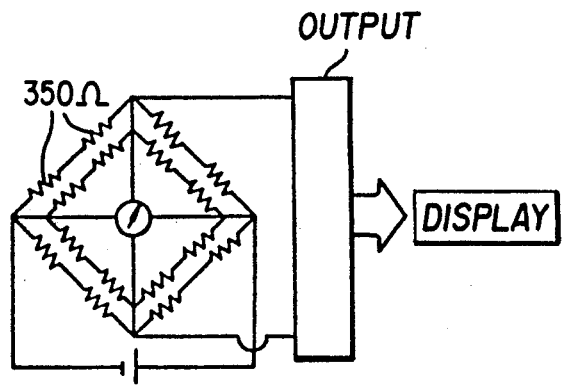
FIGS. 4, and 5 are example bridge connection diagrams, respectively, of the strain gauge.
Figure 5:
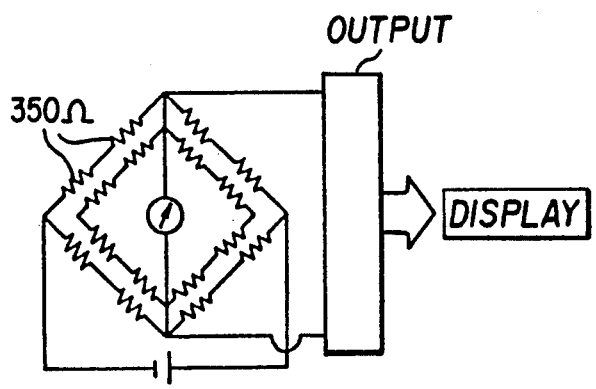

FIG. 4 is an example bridge connection diagram of the strain gauge for detection of X- and Y-axial loads, while FIG. 5 is an example bridge connection diagram of the strain gauge for detection of Z-axial load. The combination of the strain gauges 3A to 3C, and the bridge connection of the strain gauges may of course be well-known ones. For measuring the Z-axial load applied to the load receiving plate 1, for example, the weight of a vehicle of or the like, the strain gauges 3C are used. Each of resistors of the strain gauges 3C is so disposed as to form an angle of 45 deg. with respect to the direction in which the load is applied. When the Z-axial load acts on the load receiving plate 1 while a predetermined voltage is applied to the strain gauges 3C, the mean value of the sum of the voltages delivered from the strain gauges 3C is delivered as amplified by an amplifier (not shown) and displayed on an appropriate indicator. The X- and Y-axial loads can be measured similarly to the Z-axial load. Also, by detection of either a shearing or a bending strain, it is possible to measure the load in each direction.

Figure 6:
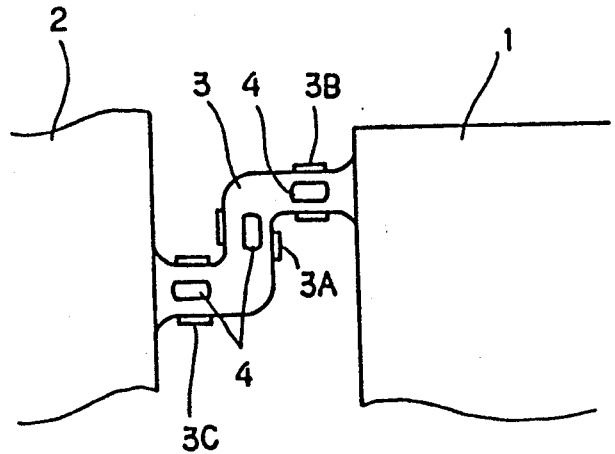
FIG. 6 is a plan view showing a variant of the beam.

FIG. 6 shows a variant of the beam 3, now shaped like a crank in the horizontal direction. The shape of the beam 3 is not limited to this crank form, but it may be of such a structure and shape that the beam deflects at predetermined portions thereof in response to the X-, Y- and Z-axial loads.

The measuring apparatus thus constructed according to the present invention can be designed to be an integral plate-like structure comprising the load receiving plate 1, frame member 2 and beams 3 by which the plate 1 and frame member 2 are coupled to each other. This integral plate-like structure may be made of steel plate. aluminum, duralumin, ceramic, plastic or a similar meterial. The measuring apparatus may be about 5 cm high at maximum, and can be designed extremely lightweight though the weight of the equipment depends upon the material used. Furthermore, the beams 3 may be more than four in number. Increased numbers of the strain gauges 3A to 3C may be adopted.

The measuring apparatus having been described in the foregoing can be applied in various fields, and it may of course be used similarly to the measuring apparatus disclosed in the previously mentioned U.S. Pat. No. 4,726,436 and which also uses strain gauges. Moreover, the load receiving plate 1 may be so constructed as to overhang on the periphery of the measuring apparatus, that is, to overhang the frame member 2.

What is claimed is:

1. A measuring apparatus, comprising a load receiving plate; a frame member enclosing said load receiving plate; at least four beams coupling said load receiving plate and said frame member to each other, thereby supporting said load receiving plate; and strain gauges provided on said beams; said at least four beams being crank-shaped beams, each comprising two substantially parallel first portions and a second portion substantially perpendicular to and connecting said two first portions, and said gauges being provided on each of said two first portions and said second portion.

2. A measuring apparatus according to claim 1, wherein said first portions extend horizontally and said second portion extends vertically.

3. A measuring apparatus according to claim 1, wherein said first portions and said second portion all extend horizontally.

4. A measuring apparatus according to claim 1, wherein each of said first portions and said second portion have formed therein a through-hole.

5. A measuring apparatus according to claim 1, wherein said load receiving plate has two pairs of opposing sides in plan view and said at least four beams couple one of said two pairs of opposing sides and said frame member.

* * * * *